United States Patent Office 3,543,289
Patented Nov. 24, 1970

3,543,289
VARIABLE MAGNIFICATION EXPOSURE DEVICE
FOR A REPRODUCTION APPARATUS
Yutaka Koizumi, Tokyo, Japan, assignor to Kabushiki
Kaisha Ricoh, Tokyo, Japan
Filed Sept. 20, 1968, Ser. No. 761,125
Claims priority, application Japan, Sept. 29, 1967,
42/62,689
Int. Cl. G03b 27/34
U.S. Cl. 355—57                                3 Claims

ABSTRACT OF THE DISCLOSURE

A reproduction apparatus comprises a housing divided into an optical path chamber, a photosensitive paper chamber, an electrical control chamber, and a developer chamber. In the optical path chamber there are a light source, a first fixed mirror facing the original which is placed on a transparent plate surmounting an aperture in the table of the housing, a movable reproduction optical system and a second movable mirror facing the movable reproduction optical system and the photosensitive paper. The movable reproduction optical system includes a lens and a plane reflecting mirror behind the lens and the optical system and second movable mirror are coupled for movement in the same direction in unison with each other to provide variation in the magnification of reproduction.

---

This invention relates to a variable magnification exposure device for a reproduction apparatus in which the magnification of reproduction is varied by fixing an original and photosensitive paper and moving a movable reflection mirror and a movable lens positioned in the optical path of reproduction.

In the existing reproduction apparatus, in order to vary the magnification, an original and photosensitive paper are moved back and forth in unison with respect to a fixed lens. Such a mechanism is complex and not easy to handle because the original must be moved, its movable parts are large, and it is subject to external shock forces because the movable parts are located outside the housing of the reproduction apparatus.

It is, therefore, an object of the invention to provide a variable magnification exposure device which is simple and strong in structure and easy to handle.

Figure 1:
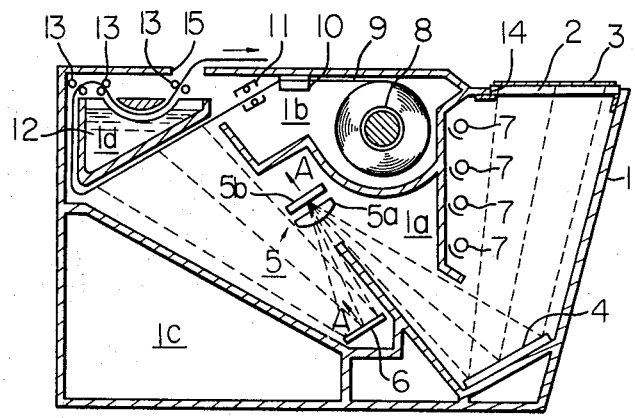
Figure 2:
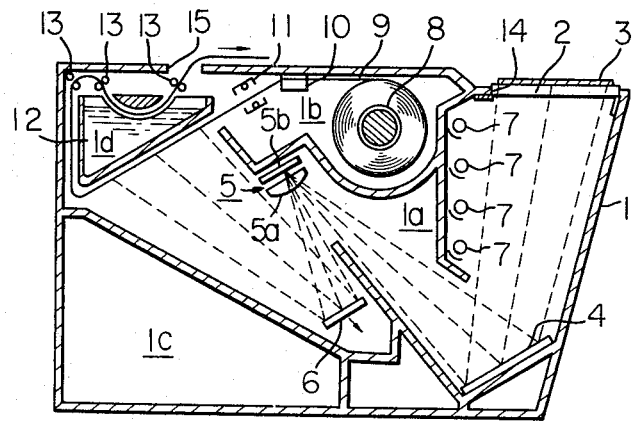

For a better understanding of the invention, reference is made to the following detailed disclosure of this invention taken in conjunction with the accompanying drawing wherein:

FIG. 1 is a side sectional view of a variable magnification exposure device for a reproduction apparatus according to this invention, showing the device set for high magnification; and FIG. 2 is a view similar to FIG. 1 but showing the device placed at a lower magnification.

A glass plate 2 is put on an aperture 14 of a housing 1 of a reproduction apparatus and it serves as a stand for placing an original 3 thereon. The inside of the housing 1 is divided into an optical path chamber 1a, a roller chamber 1b, an electric control chamber 1c, and a developer chamber 1d. A fixed reflection mirror 4, a movable lens 5, a movable reflection mirror 6 and illumination light sources 7 with reflection shades are installed in the optical path chamber 1a. The movable lens 5 is an optical system consisting of a lens 5a and a reflection mirror 5b, and the fixed reflection mirror 4, the reflection mirror 5b and the movable reflection mirror 6 are set parallel to one another. The movable lens 5 and the movable reflection mirror 6 are movable in unison with each other in the same direction. The roller chamber 1b has a roller shaft 8 on which a roll of photosensitive paper 9 is mounted for rotation, and in the path of the photosensitive paper, there are mounted a film cutter 10 for cutting the photosensitive paper 9 and a charger 11 for charging the photosensitive paper 9 by corona discharge. Moreover, a power transformer, a drive motor and other electric parts (not shown in the drawing) are installed in the electric control chamber 1c, liquid developer 12 fills the developer chamber 1d, and a guide roller 13 for the photosensitive paper is mounted for rotation.

The exposure device of the invention is composed as described above, and the photosensitive paper 9 is drawn out by a suitable drive mechanism, is cut by the cutter 10, and is guided to an end of the optical path chamber 1a after being sensitized by the charger 11. When the original surface is illuminated from the inside by the illumination light sources 7, the light from the original surface is reflected by the fixed reflection mirror 4, arrives at the movable lens 5, passes through the lens 5a, is reflected by the reflection mirror 5b, again passes through the lens 5a, is reflected by the movable reflection mirror 6, and is focused on the photosensitive paper 9. When the exposure is finished, the illumination light sources 7 are turned off, and the photosensitive paper 9 is guided by the guide roller 13, passes through the liquid developer 12 and comes out from the photosensitive paper exit 15.

Considering that the movable lens 5 and the movable reflection mirror 6 respectively move from the position shown in FIG. 1 to the position shown in FIG. 2 in the direction shown by arrow A, the distance between the original surface and the lens increases while the distance between the lens and the surface of the photosensitive paper 9 decreases so that the magnification may be reduced compared to the arrangement in FIG. 1. During this movement, moreover, if the original surface and the surface of the photosensitive paper 9 are placed in conjugation with each other with respect to the lens 5a, an arbitrary magnification can be obtained between the two conditions shown in FIG. 1 and FIG. 2.

The present invention makes it possible to vary the magnification by moving the movable lens and the movable reflection mirror placed in the optical path without moving the original and the photosensitive paper. In this device, therefore, the structure is simple and the movable parts can be made compact. Further, the device is strong and is quite easy to handle because the movable parts do not appear outside the housing.

While I have disclosed one embodiment of the present invention, it is to be understood that this embodiment is given by way of example only, and not in a limiting sense, the scope of the present invention being defined by the appended claims.

What is claimed is:

1. A reproduction apparatus having a variable magnification exposure device comprising a mounting table for an original having a housing with an aperture therein surmounted by a transparent plate, said housing including partition means therein dividing the interior thereof into an optical path chamber, a photosensitive paper chamber, an electrical control chamber and a developer chamber, a light source in said optical path for illuminating the original, a first fixed mirror in said optical path chamber facing the original, a movable reproduction optical system including a lens, and a plane reflecting mirror behind said lens, said optical system being in said optical path chamber to receive a reflected image of the original from said first mirror and to transmit an image thereof, and a second movable mirror in said optical path chamber facing said movable reproduction optical system and photosensitive paper in said photosensitive paper chamber to reflect the image from the optical system to the photosensitive paper, said movable reproduction optical system and said second movable mirror being coupled for movement in the same direction in unison with each other so that a variation in the magnification of reproduction is obtainable.

2. Apparatus as claimed in claim 1, wherein said light source is adjacent the optical axis between the first fixed mirror and the original.

3. Apparatus as claimed in claim 1, wherein said first and second mirrors and said reflecting mirror of the optical system are all parallel to one another.

References Cited

UNITED STATES PATENTS

| | | | |
|---|---|---|---|
| 2,985,067 | 5/1961 | Hauptvogel et al. | 355—60 |
| 3,137,225 | 6/1964 | Cuthbert | 355—27 X |
| 3,364,816 | 1/1968 | Jeffree | 355—51 |

JOHN M. HORAN, Primary Examiner

KENNETH C. HUTCHISON, Assistant Examiner

U.S. Cl. X.R.

355—60, 66